United States Patent [19]

Nelson

[11] Patent Number: 4,943,153

[45] Date of Patent: Jul. 24, 1990

[54] GUIDE MEANS FOR RANDOM ACCESS RETRIEVAL APPARATUS

[76] Inventor: John C. Nelson, 117 W. Park, Providence, R.I. 02908

[21] Appl. No.: 242,281

[22] Filed: Sep. 9, 1988

[51] Int. Cl.⁵ .............................................. G03B 33/06
[52] U.S. Cl. ...................................... 353/25; 353/110
[58] Field of Search ...................... 384/48, 49, 50, 25, 384/42; 353/25, 20 R, 20 A, 27 R, 27 A, 120, 110, 108

[56]  References Cited

U.S. PATENT DOCUMENTS

| 2,903,307 | 9/1959 | Peters et al. | 384/50 |
| 3,145,065 | 8/1964 | Cator | 384/49 |
| 3,233,999 | 2/1966 | Rieman et al. | 384/42 |
| 3,421,802 | 1/1969 | Irazoqui | 353/110 X |
| 4,132,469 | 1/1979 | Harvey | 353/25 |
| 4,746,209 | 5/1988 | Corrado | 353/25 |

FOREIGN PATENT DOCUMENTS 283855 10/1952 Switzerland ........................ 384/48

OTHER PUBLICATIONS

Research Disclosure 2/82 #21439 pp. 54–55 "Micro-Fiche Image Storage" Ferguson et al.

*Primary Examiner*—Harry N. Haroian
*Attorney, Agent, or Firm*—Frank L. Abbott

[57] ABSTRACT

In a random access retrieval apparatus having disc-/radial selection and path length compensation systems a bearing and guide means permitting and transmitting high speed linear, angular and rotational motion among a rotating shaft, a frame and a driven element. A first bearing element mounted on a shaft for rotational movement therewith and linear movement there along, a second bearing element supporting the frame for angular motion relative to the shaft and first bearing element and for linear movement with the first bearing element and relative to the shaft.

17 Claims, 3 Drawing Sheets

GUIDE MEANS FOR RANDOM ACCESS RETRIEVAL APPARATUS

The present invention relates to a disc/radial selection system which requires a bearing and guide means facilitating high speed, linear, angular and rotative motion capable of use in other systems in which precise positioning, positive control and rapid motion among the elements are absolutely necessary to the function of the system.

Examples of such apparatuses are those found in the high speed retrieval of random accessed images such as disclosed and claimed in the inventor's U.S. Pat. No. 4,679,922 issued July 14, 1987 and his co-pending Application Ser. No. 011 605 filed Mar. 24, 1987 now U.S. Pat. No. 476,9915.

Other examples of bearing and guide means which may be considered pertinent are found in U.S. Pat. No. 3,464,285 issued to H. E. McCabe Sept. 2, 1969 and U.S. Pat. No. 2,903,307 issued to R. W. Peters et al Sept. 8, 1959. After considering the following description in the light of the drawing, the difference in anticipated utility, concepts, operation speed and precision will be readily apparent.

The bearing and guide means disclosed herein are for high speed apparatuses which require absolute accuracy in positioning a frame member linearly in a position adjacent, a selected windowed disc bearing multiple images. The disc being one selected out of a stack of similar discs carrying some 1000,000 images and wherein an image on a selected disc may be retrieved within one half of a second.

The object of the invention is to provide a guide means which permits a frame to move rapidly linearly along a rotating shaft.

A further object is to provide a bearing means which permits a rotating shaft supporting the guide means to rotate a drive means for moving a selected windowed disc wherein a desired image lies along a radius of the disc in a position for retrieval of the information thereon.

The photographic equipment, microtomes, micrometers and other fields wherein rotational and linear motion is required and positioning must be positively controlled and precisely achieved, it is the objective of this invention to eliminate the "piggy back" of the X-Y carriages on each other thereby eliminating excess weight and reducing the size of the motors and the costs of compoments.

Another object is to provide movement with substantially reduced friction which can be accomplished by using a ball slide, a roller slide or a channel sleeve slide between linearly moveable parts.

Another object is to provide a means for converting rotational to linear motion by a detent and screw assembly to permit a slide to move linearly on a second slide.

It is also an object of this invention to unveil a bearing and guide means which is durable, operated with minimum friction, highly efficient, compact, can utilize state of the art materials and can be manufactured economically.

The application and utility of this bearing and guide means in different combinations, as well as other objects, and the many attendant advantages, will readily be appreciated as the same become better understood by reference to the following description when considered in connection with the accompanying drawings.

The invention provides for a high speed bearing and guide means for positively controlling and positioning a disc/radial selection means in a random access image retrieval system.

The images are stored on windowed discs and a stack of such discs are placed in the retrieval system for retrieval of a certain image on a certain selected disc. To select an image a frame or carriage is moved into proximity to the perimeter of the selected disc; a drive means mounted on the frame rotates the disc until the selected image is in a position where the radius on which it lies can be intercepted by a scanning device.

The frame is carried by a gear and bearing means comprised of a drive shaft, bearing means having an inner race fixed to the shaft and outer race rotatable relative thereto. The frame is moved linearly along the shaft to a position where a drive means is opposite the selected disc, a drive means is moved to contact the perimeter of the desk and then rotated by the shaft to place the selected image in a desired radial position.

The invention provides for a high speed guide and bearing means which is adaptable to use with path length compensation mechanisms which employ relatively moveable brackets one carried by the other and moveable linearly relative thereto by translating rotary to linear motion; the other being a support and moveable by means relative to the mechanism separate from that moving the supported bracket in the same direction as the movement of the supporting bracket.

The structure and operation will be explained in more detail by reference to the drawings.

BRIEF DESCRIPTION OF THE DRAWINGS

In FIG. 1 a cartridge 100 partially broken away and partially in exploded view is shown. The cartridge, moved from its installed position for the sake of clarity, supports a stack of discs 1 peripherally by means 58.

Figure 1:
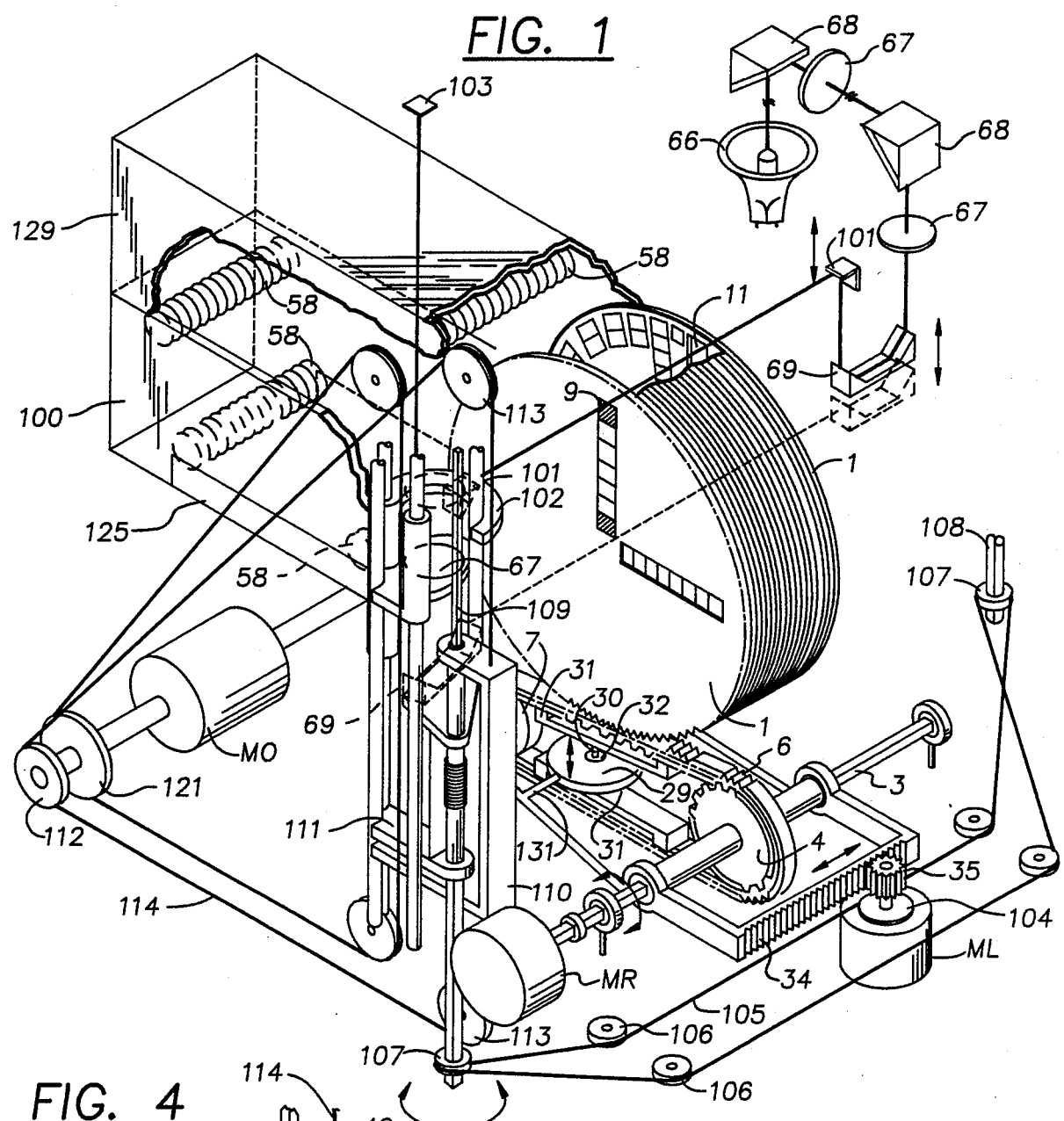
FIG. 1 illustrates a random access retrieval apparatus having disc/radial selection and path length compensation systems.

The device has three degrees of motion—x, y and z—to access selected images, and auxiliary motions to maintain constant optical pathlengths. Motions z and x are implemented by the disc/radial selection mechanism, while the remaining motions are considered as part of the optical system.

The disc/radial selection mechanism is a combination linear/rotational device.

The linear component is comprised of a rack 34 driven by a pinion 35 mounted on the shaft of motor ML and associated support structures. Rotation of the pinion 35 slides the radial position selection component carried by the rack 34 support assembly axially along shaft 3 to a position adjacent the selected disc 1.

The rotational component comprises a drive pulley 4, as idler pulley 7, a belt 6 trained over said pulleys, a motor MR, a clutch mechanism 29 and associated supporting structures. Motor MR rotates the keyed shaft 3 thereby rotating the pulley 4 and driving the belt 6. The clutch mechanism is comprised of a shaft 30 connected to lifting means 32 which is supported from the chassis by means 131. When the means 32 is activated the shaft 30 raises the upper run of the belt into engagement with the periphery of the selected disc 1 and the disc is rotated until the radius carrying the selected data image 9 moves into proper aligned position with the clear windows 11 in the other discs 1.

Figure 2:
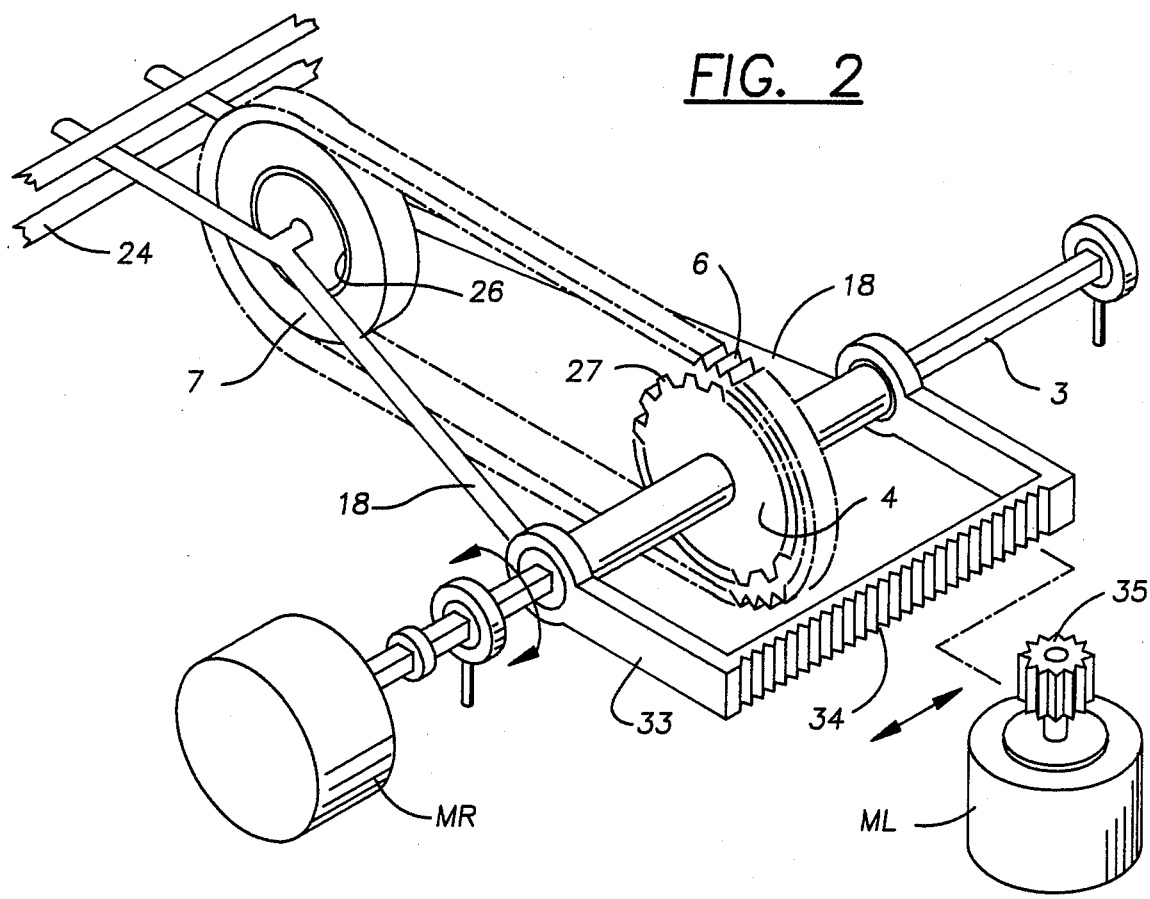
FIG. 2 illustrates a disc/radial selection system comprising a frame, bearing and guide means and drive means to impart both linear and rotational motion.

In considering FIG. 2 it will be apparent that the shaft 3 is supported by spaced bearing brackets at one thereof and adjacent the motor MR, the motor MR constitutes power means for rotating the shaft relative to the brackets. Slideably mounted on the shaft is a frame like member 34, 33, 18, a power means ML moves said frame linearly of the shaft. The motor MR rotates the shaft 3 to transmit power from the motor through the shaft and belt 6 to the selected disc. There are projections on the member 18 to engage the spaced elements 24 and limit rotation of the frame.

Figure 4:
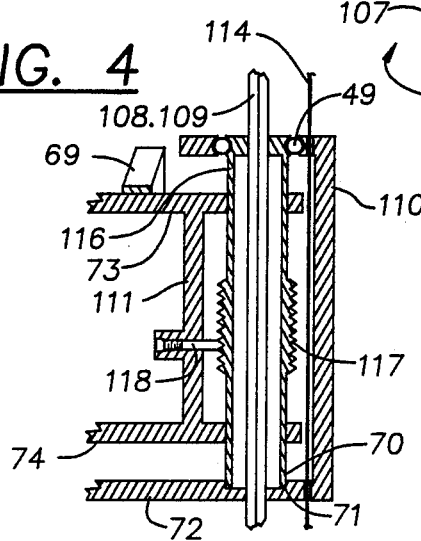
FIG. 4 is a part sectional view which shows in greater detail the two bracket means for providing separate linear adjustment for the elements of the path length compensation system together with the bearing and guide structures for rotational and linear motion.
Figure 3:
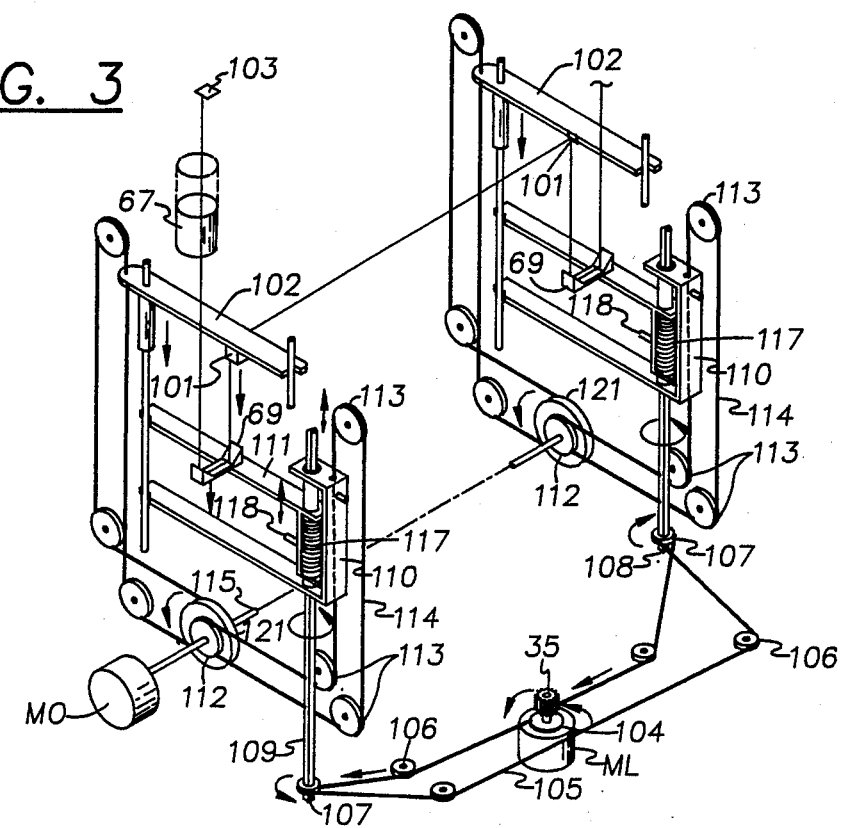
FIG. 3 shows the path length compensation system of FIG. 1.

The optical system, shown in FIGS. 3 and 4 is comprised of an illunination or scanning device 66, lens 67, mirrors 68, paired mirrors 69, level select mirrors 101 and associated support and guide structures.

During the time that the disc/radial selection mechanism is finding and rotating the selected disc, the optical system simultaneously positions and level selection mirrors 101 so that the optical axis is at the correct height to intersect the selected image frame 9. The level selection mirrors 101 are mounted on level selection tables or carriages 102 (only one carriage being illustrated in FIG. 1 for vertical movement whereby the optical axis may be adjusted continuously or incrementally from a position substantially at the center of the discs 1 along a radius to a position substantially at the periphery of the discs by a pulley and cable arrangement driven by motor MO.

As the disc and level positions are moved, undesirable changes take place in the optical pathlengths. These changes are corrected by auxiliary means in the optical system called the pathlength compensation mechanism. The causes and effects of pathlength changes and the solution are described next.

When the level position (optical axis) is moved up by the level selection mirrors 101, the distance between the selected disc image and the lens lengthens, as does the distance between the selected image and the illumination source. When the disc position is moved toward the lens by the disc/radial selection mechanism, the distance between the selected disc image and the lens shortens, while the distance between the selected image and the source lengthens.

The effect of any change in the image-to-lens pathlength is to change the size of the primary aerial image 103 and its distance from the lens. In order to be readily utilized by display or transmission means, the aerial image must be kept constant in position and in size.

The effect of any change in the image-to-source pathlength is to change the cross section of the source cone intersecting the accessed frame, effecting the brightness and evenness of illunination.

The pathlength compensation mechanism is designed to keep the primary aerial image constant in size and position, regardless of whether disc and level positions change independently or concurrently.

The pathlength compensation mechanism is quite similar to the disc/radial selection mechanism in that it is a combination linear/rotational device. The linear component is driven and compensates for changes in level selection while the rotational component is driven and compensates for changes in sic selection.

Both the linear disc selection motor ML and the level selection motor of the optical system MO have auxiliary linkages to two identical pathlength compensation linear/rotational devices located at either end of the disc stack as shown in FIGS. 3 and 4. These linkages actuate two double bracket assemblies.

The outer brackets 110 are the linear components and adjust the pathlength relative to level selection. As the shaft of motor MO rotates the level selection drive pulleys 112, thereby moving the double bracket assemblies in their entirety by means of cables 114 and idler pulleys 113. Referring to FIG. 3 (an expanded view of the compact assembly in FIG. 1), whenever the level selection mirrors descend, the double bracket assemblies slide down shafts 10B and 109, carrying the mirror pairs 69 with them and keeping the optical pathlengths constant. Because the mirror pairs 69 fold the path back on itself, the mirror pairs 69 need travel only half as far as the level selection mirrors 101; :he auxiliary pulleys 112 are therefore only half the diameter of the level selection drive pulleys 121.

The inner brackets 111 are the rotational components and adjust the pathlength relative to disc selection. As the disc selection motor ML rotates its drive pinion 35, it also rotates auxiliary pulley 104, which rotates shafts 108 and 109 in opposite directions from one another by means of cables 105, idler pulleys 106 and shaft-mounted pulleys 107. Referring to FIG. 4 the keyed (noncircular in section) rotating shafts 108 and 109 raise and lower the inner brackets 111 relative to the outer brackets 110 by rotating the support tubes 116. As the helically threaded portion of the tubes 117 turn, they carry the engaged detents 118 and the inner brackets 111 axially. Again, because the optical path is folded back on itself by the mirror pairs 69, changes in disc position need be compensated only by half; the pitch of the helixes and the diameters of linkage pulleys are implemented accordingly. Since the total linear travel of the disc/radial selection mechanism is equal to the thickness of the stack, the length of travel of the inner brackets 111 and the length of the helical sections will be equal to helf the thickness of the stack.

To recap the actions of the double bracket mechanism, again referring to FIG. 3. Whenever the level position is changed, cables 114 slide the outer brackets 110 axially along keyed shafts 108 and 109, carrying the inner brackets 111 and mirror pairs 69 with them to compensating positions, whenever the disc position is changed, the keyed shafts 108 and 109 rotate sliding brackets 111 axially along support tubes 116 by means of helixes 117 and detents 118, carrying the mirror pairs 69 to compensating positions. When both level position and disc position are changed simultaneously, the outer and inner brackets move concurrently and independently.

The apparatus just described can be viewed as a "general purpose" device meeting a wide variety of high-speed image retrieval needs.

PREFERRED EMBODIMENT OF INVENTION

In the embodiment of FIG. 2 the linear component of the disc/radial selection is comprised in part of a U shaped member 33 having a rack 34 thereon driven by a pinion 35 mounted on the shaft of motor ML and associated support structures. Rotation of the pinion 35 slides the radial position selection frame comprised of components 22 carried by the rack 34 support assembley and sleeve element 21 axially along shaft 3 to a position adjacent the selected disc 1.

The rotational component comprises a drive pulley 4, an idler pulley 7, a motor MR, a clutch mechanism (not shown), a belt 6 driven by said motor MR when said clutch is actuated and said motor rotates shaft 3 and pulley 4. The pulley 7 is supported from a U-shaped member 18. The surface of belt 6 is notched at 28 to engage similar notch as on the perimeter of a disc 1.

To provide for the high speed precise operation required by the selection, it is necessary to have durable substantially frictionless bearing means combined with a guide means capable of comparative performance, examples of such bearing and guide means are illustrated in FIGS. 5-10 and described hereafter.

Attention is invited to FIG. 4 which shows a portion of the level select partially in section in which ball bearings 49 and associated races are disposed at the upper end of the sleeve member 70 of the bracket 110 to form a sleeve bearing for facilitating rotation of the member 70 relative to the other structures while the intermediate portions of the member 70 are journaled for sliding linear and rotational movement relative to the arms 73 and 74 of bracket 111. The lower end portion 71 of the tube 70 is journaled into a recess (unnumbered) in the lower bracket arm 72 for rotation relative thereto.

The motion of bracket 110 is linear while that of the sleeve member 70 rotates to raise and lower the bracket 111 relative to the bracket 110 through engagement of threaded portion of 117 of sleeve 70 with the detent means 118 carried by bracket 111. All motions being carried on simultaneously at very high speeds. Obviously the bearing elements illustrated in FIGS. 5-10 could be substituted for the sleeve and ball bearing means shown in FIG. 4.

As the invention herein is studied further in the light of FIGS. 5-10, it will become apparent that they have utility in combinations other than the retrieval apparatus disclosed. Microtomes, microscopes, micrometers, photographic equipment, duplicating and printing systems, etc.

Figure 6:
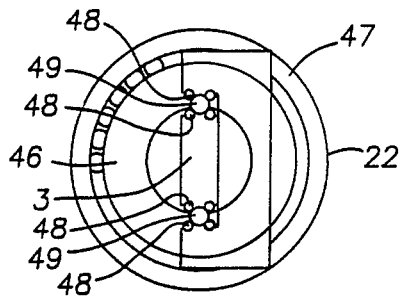
FIG. 6 is a sectional end view of the structure of FIG. 5.
Figure 5:
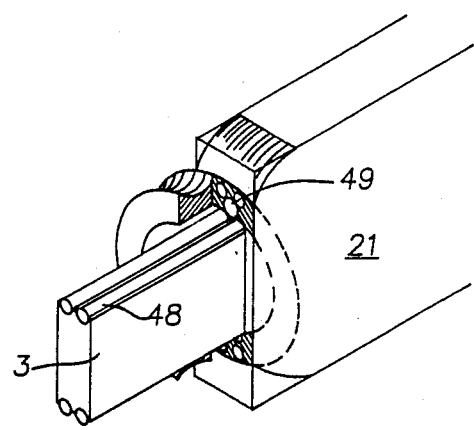
FIG. 5 is a view of details of the bearing and guide means shown partly in section.

In FIGS. 5 and 6 a sleeve element 21 is rigidly joined to inner race 46 of bracket bearings 22 for rotation with shaft 3 and relative to races 47. The shaft 3 on its top and bottom sides has longitudinally extending spaced parallel cylindrical bearing elements 48 which with similar elements 48 on the surfaces of the bracket bearing 22 comprise the inner and outer races respectively for the ball bearings 49, thereby providing high speed linear and rotational movements which permits absolute control and accurate positioning of the disc/radial selection mechanism.

Figure 8:
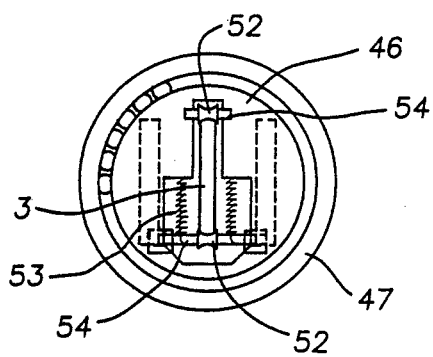
FIGS. 7 and 8 and 9 and 10 depict two variations of the subject matter of FIGS. 5 and 6 shown both in perspective and in a sectional end view.
Figure 7:
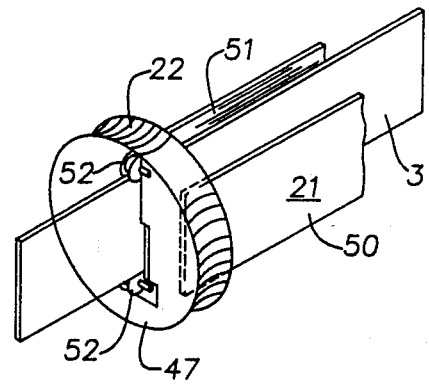

FIGS. 7 and 8 are directed to an embodiment which permits the shaft 3 to have a greater vertical dimension and provides for greater spacing between the bearing points and the center of rotation. In this instance the carriage sleeve 21 is comprised of spaced rigid bars 50 and 51. The inner race 46 mounts the shaft 3 for relative linear motion there between by spaced roller bearings 52 mounted in the inner race and biased against the edges of the shaft 3 by springs 53. The means mounting the roller bearings 52 in the bearing race comprise axles 54. The upper axle being supported in openings in the sides of a rectangular bore receiving the shaft 3. The lower axles 54 having its ends received in slots which permit the springs 53 to bias the upper and lower axles 54 and the roller bearings carried thereby into contact with the edges of the shaft.

Figure 10:
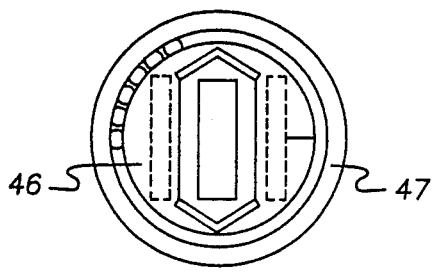
Figure 9:
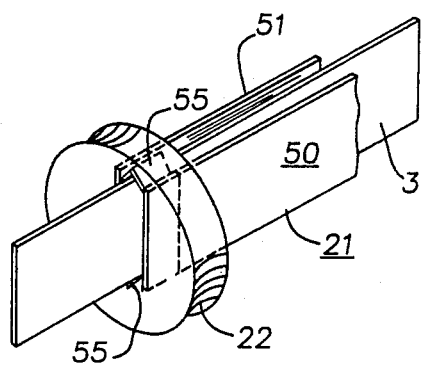

FIGS. 9 and 10 depict an embodiment in which frame 21 is composed of rigid bar members 50 and 51. Instead of roller bearings 52 or ball bearings 49 a low cost V - shaped bearing 55 of a self lubricating material such as Delvin is utilized.

Disclosed herein is a high speed, disc/radial selection assembly which employs rotational and linear guide and bearing means which facilitate accurate positioning of the apparatus to select a desired image held in a bank of 100,000 such images and to retrieve that image from the other images in approximately one half second.

Since various modifications within the spirit of the invention may occur to those skilled in the art, it is intended that no limitation be placed on the invention except as defined by the scope of the claims.

I claim:

1. In an apparatus for random access retrieval of micrographic and data images stored along the radii of stacked windowed discs, a disc selection system and an optical system, said systems comprised of elements and including a first power means for moving elements of said disc selection system linearly and elements of said optical system rotationally, a second power means for moving elements of said disc selection system angularly and rotationally and a third power means for moving said optical system linearly and a plurality of bearing and guide means which transmit rotary and linear motion, each bearing and guide means comprised of a shaft transmitting rotary motion and means permitting linear sliding movement along said shaft, a carrying structure for said optical system slideably mounted on said shaft, means mounted on said carrying structure for rotation with said shaft, supporting structure for elements of said disc selection system slideable along an associated shaft to position the disc selection means adjacent a selected disc and a means rotatable with said shaft rotating the selected disc into a position whereby the optical system may scan the selected image.

2. The structure of claim 1 which at least one of the bearing means comprises parallel cylindrical members affixed to surfaces disposed on opposite sides of said shaft, inner and outer bearing races, the inner race being carried by an elongated member of the supporting structure, ball bearings being positioned between the races to permit the inner race to rotate with the shaft, the face of the inner race opposite the ball bearings having parallel cylindrical members carried opposite the cylindrical members on the shaft, ball bearings received and held by said members on the shaft and face so that the element is slideable along said shaft and whereby the shaft rotates with the elongated member.

3. The structure defined in claim 1 in which the carrying structure comprises two brackets, a first bracket supporting a second bracket, the first bracket being moveable linearly by the third power means, the second bracket being moveable linearly relative to the first bracket by the second power means, the means, moving said second bracket comprises a sleeve having bearing means at opposite ends thereof the bearing cooperating the second bearings carried by said first bracket, a shaft mounted for rotation by said second power means, means mounting said sleeve for rotation with said shaft, the second bracket having a spring loaded detent means, the sleeve having a threaded intermediate portion engaged by said detent whereby when the shaft rotates the sleeve, the second bracket moves linearly relative to the first bracket.

4. The structure of claim 3 in which the bearing means at least at one of the sleeve and at least one of the bearings carried by the bracket include complementary races carried by the sleeve and first bracket with ball bearings there between and the bearing at the opposite end of the sleeve consists of the end of the sleeve in bearing relation with the bearing wall in a recess in a portion of the first bracket.

5. A bearing means comprised of an outer race and an inner race, a support member, means non rotatably fixing said inner race to said support member, said inner and outer races having friction reducing means therebetween, said inner race having means slideably mounting it upon a shaft member for rotation therewith.

6. The bearing defined in claim 5 in which the means slideably mounting the inner race on a shaft comprises parallel cylindrical members mounted on the inner face of said race opposed by similar members mounted on the upper and lower sides of said shaft and a ball bearing means interposed between and maintained in position by said parallel cylindrical members whereby the bearing means is slideable along said shaft and the inner race is rotatable with said shaft.

7. The structure of claim 5 in which the support member is U-shaped in section.

8. The structure of claim 5 in which the support member comprises parallel bars affixed to the inner race.

9. The structure of claim 5 in which the means slideably mounting the inner race upon the shaft comprises roller bearings disposed on opposite sides of the shaft and a spring means urging the bearings into contact with the shaft, said roller bearings having axle like protrusions journaled in recesses in the walls of the opening through the inner race receiving the shaft and the opposite roller bearings have axle like protrusions received in a slot whereby the roller bearings are rotatable and also biassed against the sides of the shaft.

10. A bearing and guide means comprised of an outer race, an inner race, said inner race being fixed to a support member, said inner and outer races having friction reducing means there between, said inner race having means slideably mounting it on a shaft member for rotation therewith, said shaft member being substantially rectangular in cross section and said means mounting the inner race on said shaft comprising V-shaped anti friction means, the open ends of the V's facing each other and the sides of the V's engaging the corners of the shaft to make line contact therewith.

11. A bearing and guide means comprising spaced bearing support brackets, bearings supported by said brackets, a shaft carried by said bearings for rotation relative to the brackets, power means for rotating the shaft, a frame slideably mounted on said shaft, a power means for moving said frame linearly of said shaft, second bearing means interposed between said shaft and frame whereby the shaft may rotate, a power transmission means and a means for preventing the frame rotating with the shaft.

12. The bearing and guide means of claim 11 in which a support element is comprised of an elongated member and the second bearing means are each comprised of an outer race and an inner race, the inner races being rigidly connected to the ends of the elongated member.

13. In the structure of claim 12 the elongated member is U-shaped in section.

14. In the structure of claim 12 the elongated member is comprised of parallel rectangular bars with the shaft member disposed there between.

15. A bearing and guide means including a first L-shaped bracket comprised on an elongate leg and a short leg extended upwardly at right angles thereto, extended at right angles to said short leg and parallel to said elongate leg is a second short leg, a second L-shaped bracket having an elongate leg parallel to the elongate leg of said first bracket and a short leg extended downwardly from said elongate leg and parallel to the short leg of said first bracket, said second bracket have parallel projections extended at right angles to the end of the short leg and the juncture of said first named short leg and the elongate leg of said second bracket and parallel to the right angles short leg and a portion of the elongate leg of said first bracket, a sleeve member rotatably received in openings in the projections of the second bracket and the portion of the elongate member and right angled extending projection of said first bracket, support means on the short leg of said second bracket and said sleeve supporting said second bracket in its position relative to said first bracket and means for adjusting the position of the second bracket relative to the first bracket.

16. The device defined in claim 15 wherein there is a shaft and power source operatively connected to the sleeve to rotate the sleeve relative to the brackets and means to raise and lower the brackets powered by a second power source.

17. The device defined in claim 15 in which the sleeve is journaled for rotation through the projections on said second bracket and the opening in the elongate leg of said first bracket includes a recess which cooperates with one end the sleeve to form a bearing and wherein the end of the sleeve is received in the opening in the short right angled leg of the first bracket and the end of the sleeve and the wall of the opening form bearing races having bearing means therebetween.

* * * * *